United States Patent [19]

Rowley

[11] 3,726,064
[45] Apr. 10, 1973

[54] SCRUBBING APPARATUS FOR POLLUTED GASES

[75] Inventor: Harold A. Rowley, Palos Heights, Ill.

[73] Assignee: M. H. Detrick Company, Chicago, Ill.

[22] Filed: June 3, 1970

[21] Appl. No.: 43,042

[52] U.S. Cl. ..................55/241, 261/17, 261/112, 261/DIG. 19
[51] Int. Cl. ............................................B01d 47/12
[58] Field of Search ....................55/240, 241; 261/3, 261/112, 17, DIG. 19

[56] References Cited

UNITED STATES PATENTS

| | | | |
|---|---|---|---|
| 3,353,800 | 11/1967 | Jens | 261/3 |
| 1,989,774 | 2/1935 | Snow | 261/112 |
| 3,475,012 | 10/1969 | Britton et al. | 261/112 |
| 3,313,533 | 4/1967 | Powers | 261/112 X |
| 3,458,178 | 7/1969 | Warnick | 261/17 |
| 3,440,803 | 4/1969 | Wechselblatt | 261/112 X |
| 3,018,847 | 1/1962 | Stanlk | 261/112 X |
| 2,133,819 | 10/1938 | Howse et al. | 55/241 X |

FOREIGN PATENTS OR APPLICATIONS

| | | | |
|---|---|---|---|
| 450,439 | 7/1936 | Great Britain | 55/241 |

*Primary Examiner*—Robert L. Lindsay, Jr.
*Attorney*—Prangley, Dithmar, Vogel, Sandler & Stotland

[57] ABSTRACT

A liquid screen scrubbing apparatus for effectively and efficiently removing insoluble and soluble solid, liquid and gaseous pollutants and materials valuable for by-product recovery from gases such as products of combustion and other atmospheres of industrial processes. The apparatus is located in a flue between one or more sources of polluted gases and a point of discharge, the apparatus including longitudinally spaced rows of vertically disposed elongated tanks, the rows extending transversely of the flue. The tanks in a row are angularly oriented and spaced from each other, and the tanks in adjacent rows are staggered. Each tank is crescent-shaped in horizontal cross section, and the concave wall thereof faces generally upstream toward the gas source. Liquid such as water continuously flows down the concave upstream walls of the tanks forming liquid screens, and when gases moving through the flue impinge on the flowing liquid, the insoluble and soluble pollutants such as dust, liquid droplets, $SO_2$, $SO_3$, Co, etc. and by product materials are entrained or dissolved in, and carried away by, the liquid. The tanks may be mounted for rotation on vertical axes, and thus subject to variation of the angular orientation in the manner of an adjustable damper between substantially closed position and desired open positions. The gases have tortuous travel paths through the apparatus, and the paths and pressure drop in the apparatus are determined by the angular orientation of the tanks. There are optimum angular settings for the crescent-shaped tanks to provide the most efficient removal of the solid and soluble pollutants and by-product materials of given gases under given conditions of gas velocity.

1 Claim, 11 Drawing Figures

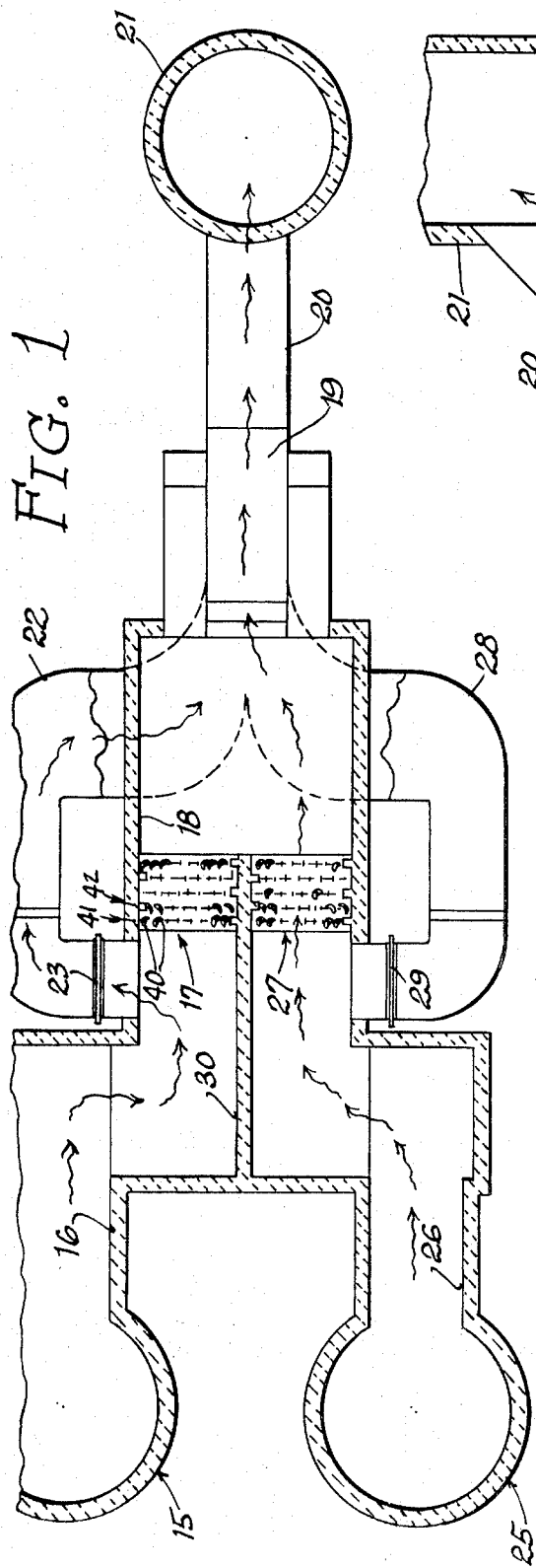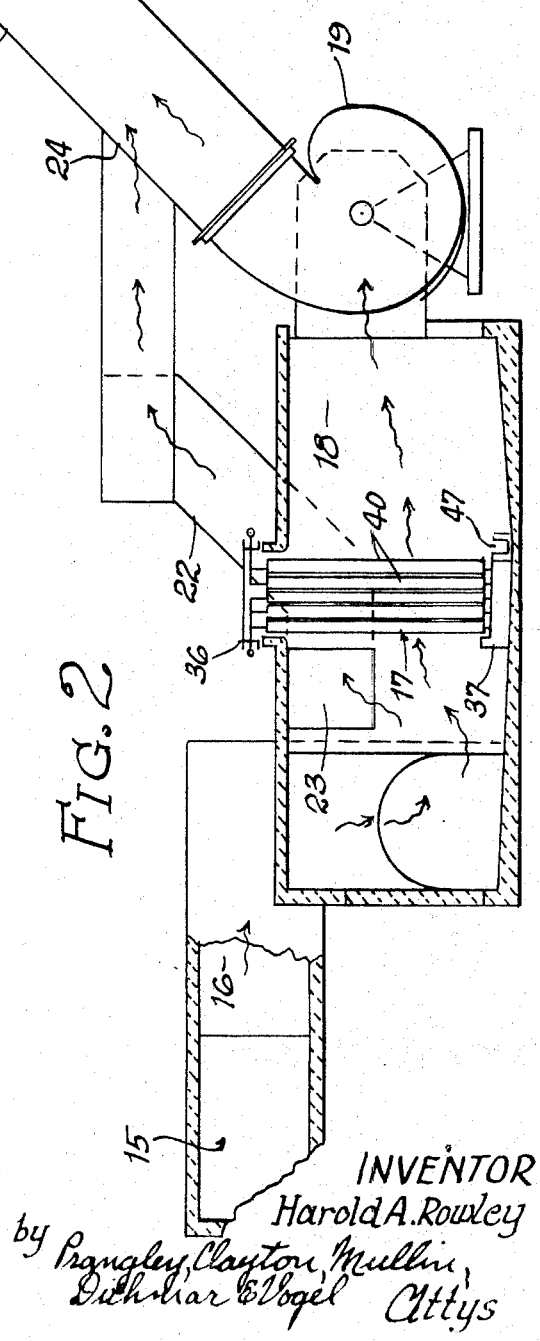

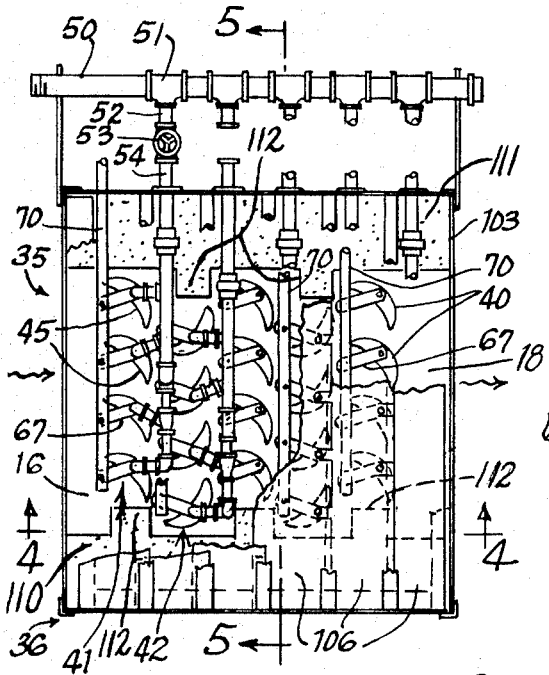

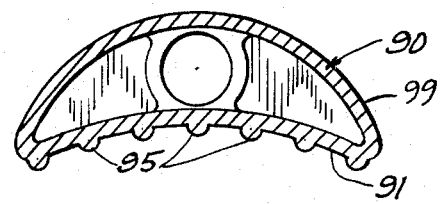
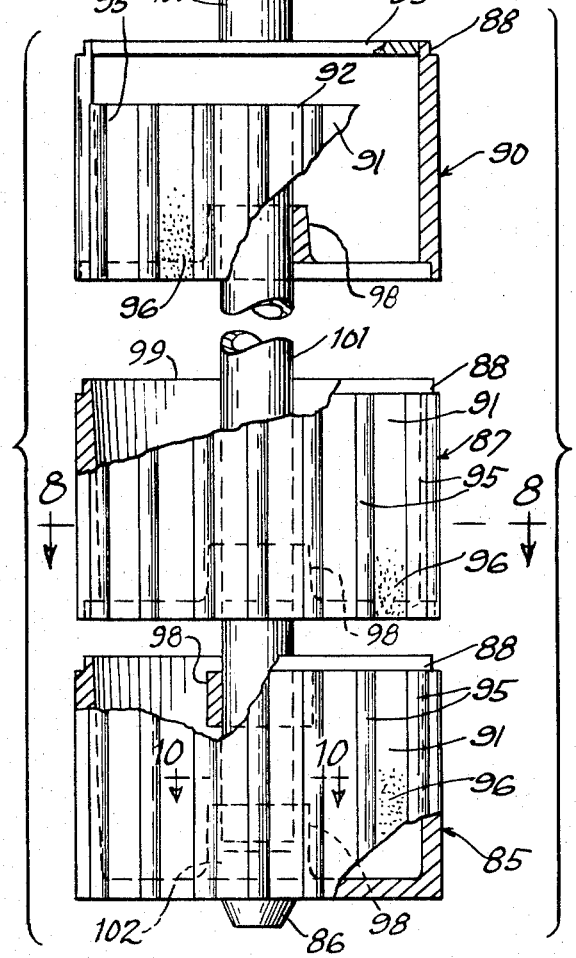
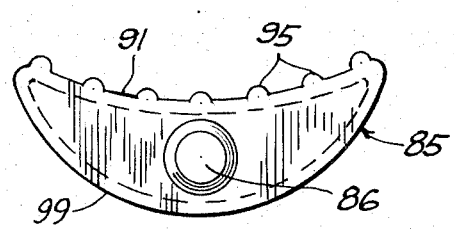
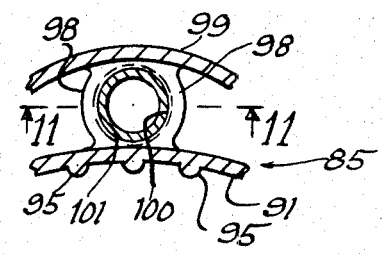
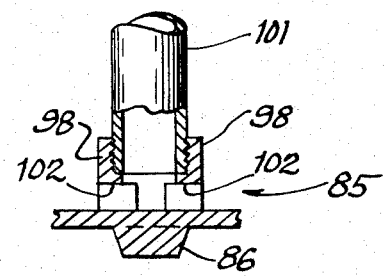

3,726,064

SCRUBBING APPARATUS FOR POLLUTED GASES

CROSS REFERENCE TO RELATED PATENT

Reference is made to U.S. Pat. No. 3,353,800, dated Nov. 21, 1967, issued to Wilmer C. Jens, assignor to the assignee of the present invention.

BACKGROUND OF THE INVENTION

This invention relates to liquid screen gas scrubbers, and more particularly to scrubbing apparatus used with industrial furnaces, refuse incinerators, materials processing apparatus and the like (grinders, buffers, ball mills, screeners, rotary drying kilns, etc.) for the purpose of eliminating or minimizing the discharge of gases containing insoluble and soluble pollutants and by-product materials of value. In performing this function, the apparatus also may vary in adjustable manner the flow of gases between the gas source and a point of discharge. The flow adjustment is accomplished by rotatably mounting the scrubbing elements so they may provide damper action. Of course, the scrubbing elements with fixed angular orientation also have a damping action on the gas flow.

As far as is known by applicant, the aforesaid Jens Pat. No. 3,353,800 and the references cited during the prosecution thereof constitute the closest prior art. No reference shows crescent-shaped tanks with wetted concave wall surfaces for a liquid screen, or discloses a liquid screen which also constitutes a damper.

SUMMARY OF THE INVENTION

The apparatus of the invention includes screens of downwardly flowing liquid such as water in a flue between one or more gas sources and a point of discharge. Substantially all the gases in the system impinge against or are exposed to liquid of the liquid screens as they travel along guided tortuous paths across the screens toward the point of discharge. Insoluble and soluble pollutants and by-product materials in the gases are entrained or dissolved in, and carried away by, the liquid, and the remaining gases which are discharged (usually to atmosphere) are comparatively free of objectionable pollutants and are at desirable temperature.

The liquid screens are formed by a plurality of vertically disposed elongated tanks which are crescent-shaped in horizontal cross section. The tanks are arranged in longitudinally spaced rows extending transversely of the flue. The tanks in each row, except when closed, are spaced from each other, and the tanks in adjacent rows are staggered, thereby cooperating to provide tortuous paths for the gases. The concave walls of the crescent-shaped tanks face generally upstream toward the gas source.

The liquid constituting the aforesaid screens flows down the concave walls of the tanks, and is collected at the bottom and carried away for processing or discharge. The angularly oriented concave and convex walls of the tanks produce comparatively smooth guided flow of the gases in the system. In preferred form, the exterior surfaces of the concave walls have a roughened texture or longitudinal ribs, or both, which cooperate to enhance the quantity of pollutants removed from the gases.

The liquid screens on the concave tank walls provide highly efficient scrubbing action. A substantial portion of the gases and pollutants of the gases impinge on the wetted concave walls of the first row of tanks, and a quantity of pollutant enters the liquid and is removed. The concave walls of the tanks in the first row direct the gases smoothly through the spaces between tanks into directed engagement with the wetted concave walls of the tanks in the second row. Additional pollutants are then removed, and the gases are directed to the third row of tanks, etc. The concave and convex walls engaged by the gases minimize the tendency toward turbulence, and thus minimize the drop in draft pressure caused by the scrubbed system. Further, the curved walls provide increased wall and liquid screen area in the same linear space, compared with flat walls, thereby enhancing scrubbing efficiency.

The tanks in the transverse rows preferably are mounted for rotation on vertical axes, and are subject to rotation between closed position and predetermined open positions, thereby providing damping action and controlling the draft pressure drop and the amount of air or oxygen flowing into the gas source. The source is a combustion chamber when the gases are products of combustion.

The damping action of the present apparatus permits optimum utilization of the available draft pressure, regardless of whether the draft pressure is large or small, natural or induced. Also, in an installation having an induced draft blower with ducts providing a by-pass to a stack, the rotatable tanks may be closed to establish the by-pass in case of blower failure, or failure of the liquid supply to the tanks.

The apparatus of the invention is used to advantage in connection with a plurality of gas sources, such as furnaces, served by the same media of draft pressure. When a furnace or other gas source is shut down for maintenance or other reason, some or all of the rotatable tanks associated therewith may be closed to isolate that gas source from the draft media.

The drawings and following description thereof relate specifically to furnaces, but it is to be understood that the invention also is applicable to other gas sources such as above mentioned, and the claims are to be read accordingly.

BRIEF DESCRIPTION OF THE DRAWINGS

FIG. 1 is a diagrammatic plan view, partly in section, of a two-furnace installation utilizing the scrubbing and damping apparatus of the invention.

FIG. 2 is a diagrammatic elevational view, partly in section, showing the furnace installation of FIG. 1.

FIG. 3 is a top plan view, partly broken away, of a scrubbing and damping apparatus embodying the invention.

FIG. 4 is a fragmentary sectional view on line 4—4 of FIG. 3.

FIG. 5 is a fragmentary sectional view on line 5—5 of FIG. 4.

FIG. 6 is a fragmentary perspective view of one form of crescent shaped tank for use in the invention.

FIG. 7 is an exploded elevational view, partly in section, of another form of crescent shaped tank for use in the invention, the tank being formed of a plurality of sections.

FIG. 8 is a sectional view on line 8—8 of FIG. 7.

FIG. 9 is a bottom view of the tank shown in FIG. 7.

FIG. 10 is a fragmentary sectional view on line 10—10 of FIG. 7.

FIG. 11 is a fragmentary sectional view on line 11—11 of FIG. 10.

DESCRIPTION OF THE PREFERRED EMBODIMENT

FIGS. 1 and 2 illustrate one form of furnace installation utilizing the scrubbing and damping apparatus of the invention, the installation including two furnaces each having separate scrubbing and damping apparatus, a single fan providing induced draft, a single stack for natural draft and discharge, and associated flue and duct members.

FIG. 2 also effectively illustrates the use of the scrubbing and damping apparatus of the invention in a one-furnace installation.

Referring to FIGS. 1 and 2, a furnace 15 or other source of polluted gases has a flue 16 leading to scrubbing and damping apparatus 17 embodying the invention, the latter having an outlet flue 18 leading through induced draft fan 19 and outlet flue 20 to discharge stack 21. A by-pass duct 22 with conventional damper 23 leads from flue 16 around scrubbing and damping apparatus 17 to connection with outlet flue 20 at junction 24 (FIG. 2). The tanks in the downstream row of apparatus 17 are shown in closed position, thereby establishing gas flow through by-pass duct 22 and damper 23.

A second furnace 25 or other source of polluted gases has a flue 26 which leads to scrubbing and damping apparatus 27, the latter discharging into previously mentioned outlet flue 18. The products of combustion from furnace 25 remaining after passage through apparatus 27 are directed through fan 19 and outlet flue 20 to stack 21. A by-pass duct 28 with conventional damper 29 leads from flue 26 around apparatus 27 and connects with the aforesaid outlet flue 20 at junction 24.

A dividing wall 30 separates the two flues 16 and 26 on the upstream side of scrubber and damper apparatus 17 and 27.

The scrubbing and damping apparatus 17 and 27, as will be seen, perform two main functions. First, they effectively and efficiently remove insoluble and soluble contaminants and by-product materials from the products of combustion or other polluted gases, thereby minimizing pollutants discharged to atmosphere, and, second, they function as dampers (either fixed or movable) to achieve desired pressure drop consistent with the available draft pressure. If movable, one or both is subject to closure in the event of failure of induced draft fan 19, or a failure of the liquid supply to the apparatus, or a need to isolate one or both of the furnaces or gas sources for shutdown or repair.

Referring to FIGS. 3–5, scrubbing and damping apparatus embodying the invention is generally designated 35. The apparatus, as mentioned, is located in flue 16, 18 between a furnace or other gas source and an induced draft fan. If no fan is used in the installation, apparatus 35 discharges into flue 18 which leads directly to an associated stack or other discharge arrangement.

Scrubbing and damping apparatus 35 includes an upper support generally designated 36 (FIGS. 4 and 5) and a lower support 37, the upper and lower supports 36 and 37 cooperating to mount vertically a plurality of elongated tanks 40 which are crescent-shaped in horizontal cross section.

As best shown in FIGS. 1 and 3, crescent-shaped tanks 40 are arranged in a plurality of rows 41, 42, etc. extending transversely of flue 16, 18, the tanks in each row being normally spaced from each other with the concave walls 45 thereof facing generally upstream toward the combustion chamber or other gas source. The rows are spaced from each other longitudinally of the flue with the tanks in one row staggered with respect to the tanks in an adjacent row.

As will be seen later, each tank 40 receives a continuous flow of liquid, usually water, which fills the tank and overflows on the upstream concave wall 45. The liquid flows down the exterior surface of each wall 45, providing liquid screens in the path of the polluted gases flowing through the apparatus. The gases and entrained particulates, if any, impinge against one or more of the liquid screens and give up to the flowing liquid insoluble and soluble pollutants such as dust, $SO_2$, $SO_3$, $CO$, etc. The pollutant laden liquid is collected in the region of lower support 37 where it is discharged from a trough 47 (FIG. 4) or the like to waste or to tanks for treatment and reuse.

Liquid is supplied to tanks 40 from a manifold or header 50 having a T coupling 51 (FIGS. 3 and 5) for each row of tanks. A pipe 52 leads from T coupling 51 through a line valve 53 to a pipe 54 which feeds into a distribution pipe 55 best shown in FIG. 5. Separate fixed pipes 56 (FIG. 5) lead from distribution pipe 55 to the respective tanks 40 in a transverse row.

Each tank 40 has secured thereto a pipe 60 which extends substantially the length of the tank, the pipe 60 terminating short of the tank bottom as shown at 61 in FIGS. 4 and 5. Pipe 60 extends upwardly above the top of tank 40 and is coupled to an aforesaid fixed pipe 56 by means of a coupling 63, a swivel coupling if the tank is to be rotatable. In the form of the invention shown, a fixed pipe 56 and associated coupling 63 constitute the upper support for a tank 40.

As shown in FIGS. 4 and 5, the lower end of each tank 40 has a projecting member 65 received in a socket 66 or the like in lower support 37. Member 65 thus is rotatable on support 37 if desired.

Coupling 63 if a swivel coupling and projecting member 65 position a tank 40 and permit variation in the angular orientation of the tank. With this arrangement, some or all of the tanks 40 in the apparatus may be rotated to establish optimum paths for the products of combustion or other gases and to vary the drop of draft pressure. The latter, of course, influences the velocity of the gases through the apparatus.

While rotatable tanks 40 may be adjusted individually, it usually is desirable to gang together some or all of them. As shown by way of example in FIGS. 3–5, the several tanks in each transverse row 41, 42 etc. are ganged together. Each tank pipe 60 in a row has secured thereto a link 67 (FIGS. 3 and 4), the several links 67 having uniform orientation with respect to pipes 60 and associated tanks 40. The free ends of links 67 in each row are pivotally connected to an actuating member 70, the member 70 at an accessible end having a cross bar 71 (FIGS. 4 and 5) or other means for connection to a power mechanism (not shown) which for example operates pneumatically or hydraulically.

As will be understood from FIG. 3, back and forth movement of actuating member 70 causes rotation of tanks 40 to provide more or less restriction of the flow of products of combustion through the apparatus and to vary somewhat the length of the travel path for the polluted gases.

In preferred form, the tanks 40 in each of the transverse tank rows 41, 42 etc. are rotatable, and provided with an actuating member 70. With this arrangement, all tanks 40 are adjustable readily, and they usually are adjusted uniformly in angular orientation to establish tortuous paths through the apparatus providing a desired drop in draft pressure, or to substantially close the apparatus to the passage of gases.

Referring to FIG. 6, the tank 40 there shown is formed from two preformed metal plates 72 and 73 which differ in curvature and thus provide a tank of crescent-shape in horizontal cross section. The two plates are secured along their abutting edges 75 and 76 as by welding. Tank 40 is closed at its bottom with a bottom plate having the aforesaid projecting member 65 which rotates on bottom support 37.

Convex downstream wall 77 of tank 40 extends upwardly beyond the top edge 78 of concave upstream wall 45, causing the liquid in the tank to overflow and run down wall 45 only. A deflector plate 79 mounted atop convex downstream wall 77 is a safety feature which protects workers from steam blasts when liquid is introduced into dry hot tanks during repair operations.

It has been found that the scrubbing action is enhanced by giving the exterior surface of concave wall 45 a roughened texture. Accordingly, in preferred form, the wall 45 is roughened to a texture comparable to coarse sandpaper as shown diagrammatically at 80 in FIG. 6. This texture serves to confine the liquid flowing down the wall 45 and resist the tendency of the liquid from being blown completely from the wall by the impinging gases.

A modified form of crescent-shaped tank for use in the invention is shown in FIGS. 7–11. Here, the tank is made with a plurality of short sections, each of suitable material such as cast iron or ceramic material. As shown in FIGS. 7, 9 and 11, lower section 85 has a downwardly projecting boss 86 which supports the tank and permits rotation. Intermediate tank sections 87 are of like size and shape, except for the boss, and both sections 85 and 87 have an upper margin 88 of reduced dimension to telescope into the cooperating section immediately above. Upper section 90 is cut away at the top of concave wall 91 as shown at 92 to provide desired overflow from the tank on the concave wall only. A deflector plate 93 is mounted at the top of upper section 90 as a safety feature to protect workers.

A sectionalized tank of FIG. 7 preferably is provided with spaced longitudinal ribs 95 (FIGS. 7–10) on the exterior surface of concave wall 91, and the surface of the wall given a roughened texture diagrammatically indicated by 96. Ribs 95 confine the flowing liquid and help prevent the liquid from completely being blown off laterally by the gases.

Referring further to FIG. 10, lower section 85 has webs 98 between concave wall 91 and convex wall 99, and the same is true of the sections 87 and 90. Webs 98 define circular openings 100, a liquid supply pipe 101 (FIG. 7) extending through the openings of the several sections. Pipe 101 is secured to one of the sections so the tank may be rotated thereby, as by a threaded relationship with webs 98 in lower section 85 (FIG. 11). In such case, liquid flows from pipe 101 into the tank through lateral ports 102 in the webs.

Referring back to FIGS. 3–5, upper support 36 for tanks 40 is enclosed by a sheet metal housing 103 disposed above the tops of tanks 40, as best shown in FIGS. 4 and 5. A cover 104 hinged at 105 (FIG. 5) serves to minimize infiltration of outside air into the high-draft region within the housing.

Removable horizontal baffle plates 106 (FIGS. 3–5) enclose the bottom of housing 103 to prevent furnace gases from entering the housing and thus by-passing tanks 40 and escaping the scrubbing action. In addition, transverse vertical baffles 107 (FIGS. 4 and 5) extend downwardly from the bottom of housing 103 between the rows of tanks 40, the lower edges of baffles 107 being somewhat below the tops of the tanks. Vertical baffles 107, which serve to support horizontal baffles 106, deflect furnace gases away from the upper ends of tanks 40, thereby preventing gas passage through the space between the tank tops and horizontal baffles 106. Also, as shown in FIGS. 3 and 5, lateral walls 110 and 111 of flue 16, 18 have spaced vertical baffles 112 at one end of each tank row to prevent the gases from flowing along the walls and thus by-passing the tanks.

As best shown in apparatus 17 in FIG. 1, downstream tank row, the spacing between tanks 40 in a transverse row of tanks is such that there is a slight overlap of adjacent tanks when the tanks are rotated to closed position whereby gas flow is blocked. When rotated away from closed position, space is provided between adjacent tanks for gas passage.

An open position for the tanks 40 is shown in FIG. 3. This position, as well as other open positions, establishes guided tortuous paths through the apparatus for the polluted gases. The tanks 40 in upstream tank row 41 have uniform angular orientation, that is, the concave walls thereof all face in the same direction. The tanks 40 in adjacent row 42 likewise have uniform angular orientation, but this orientation is not the same as that in row 41. The tank orientation in row 42 is more or less the reverse of that in row 41 in terms of establishing path direction. The uniform orientation in the next downstream row is like that in row 41, and the reverse of that in row 42.

With the tank inclinations and orientations shown, the polluted gases follow smoothly guided zig-zag paths through the apparatus and experience minimum turbulence. The concave upstream walls of the tanks in row 41 direct the gases through the spaces between the tanks in that row and into engagement with the reversely oriented concave walls of the tanks in adjacent row 42 where the direction of gas flow is substantially reversed from the direction established by the tanks in row 41. Successive reversals occur at each row in the system, causing the gases to traverse a distance considerably greater than the longitudinal distance through the apparatus. The gases and pollutants impinge on numerous liquid screens in this extended travel distance, and give up substantial quantities of pollutants, and other materials which may have value in by-product recovery.

Particulate material such as dust is trapped by the liquid screen, and gases such as toxic gases or gases for by-product recovery, e.g., $SO_2$, $SO_3$, $CO$, etc., are absorbed by the liquid screen. The liquid of the screen, as mentioned, is discharged to waste, or treated for neutralization, cleaning, or by-product recovery, and reused.

The liquid used in the apparatus in many instances can be reused without extensive cleaning, or indeed any cleaning, for the reason that the liquid at all times is under low pressure and there are no spray nozzles, valves or the like subject to malfunction due to small solids in the liquid.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In a flue between a source of polluted gases, such as a furnace combustion chamber, refuse incinerator, or industrial processing apparatus, and a point of discharge, scrubbing and damping apparatus, comprising:

upper and lower supports in effective relation with said flue;

a plurality of vertically disposed elongated tanks extending within said flue between said upper and lower supports, each tank crescent-shaped in horizontal cross section, said tanks arranged in a plurality of rows extending transversely of said flue, the tanks in each row spaced from each other with the concave walls thereof facing generally upstream toward the gas source, the tanks having angular orientations providing gas travel paths between adjacent tanks with entrance spaces wider than exit spaces, said rows spaced from each other longitudinally of the flue with the tanks in one row staggered and reversely oriented angularly with respect to the tanks in an adjacent row, whereby gases flowing through the apparatus are guided smoothly by the concave tank walls on tortuous zig-zag paths;

means mounting said tanks on said supports including means mounting at least some of said tanks rotatably on said supports and means for rotating said rotatable tanks between closed position where transversely adjacent tanks are in engagement to block gas flow and predetermined open positions permitting gas flow through the apparatus, thereby providing adjustable damping action and control of gas travel paths through the apparatus; and means providing a continuous flow of liquid down the concave upstream walls of said tanks, whereby insoluble and soluble particulates and components of polluted gases impinging on said liquid are entrained and dissolved in and carried away by said liquid.

\* \* \* \* \*